US009906412B2

(12) United States Patent
Guo et al.

(10) Patent No.: US 9,906,412 B2
(45) Date of Patent: Feb. 27, 2018

(54) COLLABORATION METHOD AND SYSTEM IN DISTRIBUTED RESILIENT NETWORK INTERCONNECT SYSTEM

(71) Applicant: ZTE CORPORATION, Shenzhen, Guangdong Province (CN)

(72) Inventors: Zhui Guo, Shenzhen (CN); Yuehua Wei, Shenzhen (CN); Ting Ao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 18 days.

(21) Appl. No.: 14/899,663

(22) PCT Filed: Apr. 23, 2014

(86) PCT No.: PCT/CN2014/076008
§ 371 (c)(1),
(2) Date: Dec. 18, 2015

(87) PCT Pub. No.: WO2014/201903
PCT Pub. Date: Dec. 24, 2014

(65) Prior Publication Data
US 2016/0134477 A1    May 12, 2016

(30) Foreign Application Priority Data
Jun. 20, 2013    (CN) .......................... 2013 1 0247572

(51) Int. Cl.
*H04L 12/24* (2006.01)
*H04L 29/06* (2006.01)
*H04L 12/709* (2013.01)

(52) U.S. Cl.
CPC ...... *H04L 41/0836* (2013.01); *H04L 41/0893* (2013.01); *H04L 45/245* (2013.01); *H04L 69/14* (2013.01); *Y02B 60/33* (2013.01)

(58) Field of Classification Search
CPC ... H04L 69/14; H04L 45/245; H04L 41/0893; H04L 41/0836; Y02B 60/33
See application file for complete search history.

(56) References Cited

U.S. PATENT DOCUMENTS 7,881,230 B2    2/2011    Vinayagam et al.

FOREIGN PATENT DOCUMENTS

| CN | 102752187 A | 10/2012 |
|---|---|---|
| CN | 103107956 A | 5/2013 |
| EP | 2981026 A1 | 2/2016 |

OTHER PUBLICATIONS

P802.1AX-REV™/D2.0, Apr. 24, 2013, IEEE.*

(Continued)

*Primary Examiner* — Jae Y Lee
(74) *Attorney, Agent, or Firm* — Plumsea Law Group, LLC

(57) ABSTRACT

The embodiment of the present document provides a collaboration method in a distributed resilient network interconnected system, including: a link aggregation control protocol (LACP) system receiving system parameters notified by a distributed relay control protocol (DRCP) system, and using the system parameters of the DRCP system as system negotiation parameters of the LACP system. The embodiments of the present document further provide a link aggregation control protocol (LACP) system, wherein the LACP system includes a receiving module and a controlling module, the receiving module is configured to receive system parameters notified by a distributed relay control protocol (DRCP) system; the controlling module is configured to take the system parameters of the DRCP system as system negotiation parameters of the LACP system. The embodiment of the present document achieves a collaboration between the LACP system and the DRCP system.

18 Claims, 5 Drawing Sheets

(56) References Cited

OTHER PUBLICATIONS

Rong, Jian gji et al., "Research of Link Aggregation Cross Systems Based on LACP", Video Engineering, vol. 37, No. 7, Apr. 30, 2013 (Apr. 30, 2013), the whole document.
LAN/MAN Standards Committee of the IEEE Computer Society, "IEEE Standard for local and—Metropolitan Area Networks-Links Aggregation", IEEE Standard 802.1AX, Nov. 3, 2008 (Nov. 3, 2008), the whole document.
International Search Report and Written Opinion dated Jul. 30, 2014 in PCT Application No. PCT/CN2014/076008.
Interworking Task Group of IEEE 802.1: "Draft Standard for Local and Metropolitan Area Networks—Link Aggregation; 802-1AX-REV-", IEEE P802.1AX-REV™/D1.0, Feb. 1, 2013.
Interworking Task Group of IEEE 802.1: "Draft Standard for Local and Metropolitan Area Networks—Link Aggregation; 802-1AX-REV-", IEEE P802.1AX-REV™/D2.0, Apr. 24, 2013.
Panagiotis Saltsidis et al: "Draft Standard for Local and Metropolitan Area networks—Link Aggregation; 802-1AX-REV-d2-0-dis", P802.1AX-REV/D2.0, May 20, 2013.
European Search Report dated May 31, 2016 in European Patent Application No. 14813422.4.

\* cited by examiner

COLLABORATION METHOD AND SYSTEM IN DISTRIBUTED RESILIENT NETWORK INTERCONNECT SYSTEM

CROSS-REFERENCE TO RELATED APPLICATION(S)

This application is the U.S. National Phase application of PCT application number PCT/CN2014/076008 having a PCT filing date of Apr. 23, 2014, which claims priority of Chinese patent application 201310247572.5 filed on Jun. 20, 2013, the disclosures of which are hereby incorporated by reference.

TECHNICAL FIELD

The present document relates to data communication technology, and more particularly, to a collaboration method and system in a distributed resilient network interconnected system.

BACKGROUND OF RELATED ART

The Ethernet link aggregation is called Link Aggregation, which bundles multiple Ethernet physical links together into one logical link, so as to achieve the purpose of increasing the link bandwidth. At the same time, these bundled links are dynamically backed up each other, which can effectively improve the link reliability. The LACP (Link Aggregation Control Protocol) is a protocol that is based on the IEEE (Institute of Electrical and Electronics Engineers, Electrical and Electronics Engineers, Inc.) 802.3ad standard and is able to implement dynamic link aggregation and de-aggregation.

The current IEEE standard 802.1AX link aggregation can achieve protection for multiple links, but is limited to supporting only the port aggregation on one node, therefore it can only be used for link protection, while using the current link aggregation technology cannot protect the node on the network edge interface. Therefore, the IEEE802.1 working group set up a project for the distributed link aggregation technology, that is, one or more nodes (or systems) constitute a logical node (or logical portal) to perform the link aggregation, a plurality of links on multiple nodes are aggregated into one aggregation group, thus achieving the link and node dual-redundant network interconnected protection.

In a distributed resilient network interconnected system (DRNI), systems of the same portal use the DRCP (Distributed Relay Control Protocol) to interact to implement parameter negotiation and state notification among multiple systems, wherein the negotiated parameters comprise system parameters shared by respective systems of the present portal, and some system parameters are basic parameters used by the LACP, which requires a method for realizing the collaboration between the DRCP and the LACP.

SUMMARY

To solve the technical problem, the embodiment of the present document is to provide a collaboration method and system in a distributed resilient network interconnected system to realize the inter-system collaboration when the DRCP system and the LACP system coexist.

To solve the abovementioned problem, the embodiment of the present document provides a collaboration method in a distributed resilient network interconnected system, comprising:

after receiving system parameters notified by a distributed relay control protocol (DRCP) system, a link aggregation control protocol (LACP) system taking the system parameters of the DRCP system as system negotiation parameters of the LACP system.

The abovementioned method may further have the following feature: the LACP system notifies a port state change in the LACP system to the DRCP system.

The abovementioned method may further have the following feature: when a receiving state machine of the LACP system meets a first preset condition in a port disabled state, the receiving state machine jumps to a negotiation state after receiving the system parameters notified by the DRCP system, and jumps to an expired state after taking the system parameters of the DRCP system as the system negotiation parameters of the LACP system.

The abovementioned method may further have the following feature: when the receiving state machine of the LACP system is in the port disabled state, when the LACP system supports the distributed resilient network interconnected (DRNI) system and has not received the system parameters notified by the DRCP system, the receiving state machine remains in the port disabled state.

The abovementioned method may further have the following feature: when the LACP system meets a first preset condition and at least one of an actor port and a partner port is in an enabled state, a periodic transmitting link aggregation control protocol data unit function is enabled between the actor port and the partner port after receiving the system parameters notified by the DRCP system;

when the LACP system supports the DRNI and has not received the system parameters notified by the DRCP system, the periodic transmitting link aggregation control protocol data unit function is disabled between the actor port and the partner port.

The abovementioned method may further have the following feature: the first preset condition comprises: the LACP system supporting the distributed resilient network interconnected system (DRNI), the LACP being enabled, and the port being enabled.

The abovementioned method may further have the following feature: the LACP system notifying a port state change in the LACP system to the DRCP system comprises at least one of the following:

after a multiplexing state machine of the LACP system enters into a collecting state and a frame collection function of the actor port is enabled, notifying the DRCP system that the frame collection function of the actor port is enabled; or, triggering the DRCP system to query the state of the actor port;

after the multiplexing state machine of the LACP system enters into a distributing state and a frame distribution function of the actor port is enabled, notifying the DRCP system that the frame distribution function of the actor port is enabled; or, triggering the DRCP system to query the state of the actor port.

The abovementioned method may further have the following feature: when a second preset condition is met, a transmitting state machine of the LACP system transmits LACP packets after receiving the system parameters notified by the DRCP system.

The abovementioned method may further have the following feature: when the LACP system supports the DRNI and has not received the system parameters notified by the DRCP system, the transmitting state machine of the LACP system does not transmit LACP packets.

The abovementioned method may further have the following feature: the second preset condition comprises: the LACP system supporting the DRNI, the LACP being enabled, and a need to transmit (NTT) parameter being true.

The embodiment of the present document further provides a link aggregation control protocol system, wherein the Link Aggregation Control Protocol (LACP) system comprises a receiving module and a controlling module, wherein:

the receiving module is configured to: receive system parameters notified by a distributed relay control protocol (DRCP) system;

the controlling module is configured to: take the system parameters of the DRCP system as system negotiation parameters of the LACP system.

The abovementioned system may further have the following feature: the LACP system further comprises: a notifying module, configured to notify a port state change in the LACP system to the DRCP system.

The abovementioned system may further have the following feature: the controlling module further comprises a receiving state machine control unit, configured to, when a receiving state machine is in a port disabled state and meets a first preset condition, control the receiving state machine to jump to a negotiation state after receiving the system parameters notified by the DRCP system, and control the receiving state machine to jump to an expired state after taking the system parameters of the DRCP system as the system negotiation parameters of the LACP system.

The abovementioned system may further have the following feature: the receiving state machine control unit is further configured to: when the receiving state machine is in a port disabled state and the LACP system supports a distributed resilient network interconnected system (DRNI) and has not received the system parameters notified by the DRCP system, control the receiving state machine to remain in the port disabled state.

The abovementioned system may further have the following feature: the controlling module further comprises a periodic transmitting state machine control unit, configured to:

when the LACP system meets a first preset condition and at least one of an actor port and a partner port is enabled, after receiving the system parameters notified by the DRCP system, enable a periodic transmitting link aggregation control protocol data unit function between the actor port and the partner port; and, when the LACP system supports the DRNI and has not received the system parameters notified by the DRCP system, disable the periodic transmitting link aggregation control protocol data unit function between the actor port and the partner port.

The abovementioned system may further have the following feature: the first preset condition comprises: the LACP system supporting the distributed resilient network interconnected (DRNI) system, the LACP being enabled, and the port being enabled.

The abovementioned system may further have the following feature: the notifying module being configured to notify a port state change in the LACP system to the DRCP system, comprises at least one of the following:

after a multiplexing state machine of the LACP system enters into a collecting state and a frame collection function of the actor port is enabled, notifying the DRCP system that the frame collection function of the actor port is enabled; or, triggering the DRCP system to query the state of the actor port;

after the multiplexing state machine of the LACP system enters into a distributing state and the frame distribution function of the actor port is enabled, notifying the DRCP system that the frame distribution function of the actor port is enabled; or, triggering the DRCP system to query the state of the actor port.

The abovementioned system may further have the following feature: the control module further comprises a transmitting state machine control unit, which is configured to: when a second preset condition is met, after receiving the system parameters notified by the DRCP system, control a transmitting state machine of the LACP system to transmit LACP packets.

The abovementioned system may further have the following feature: the transmitting state machine control unit is further configured to: when the LACP system supports the DRNI and has not received the system parameters notified by the DRCP system, control the transmitting state machine of the LACP system to not transmit LACP packets.

The abovementioned system may further have the following feature: the second preset condition comprises: the LACP system supporting the DRNI, the LACP being enabled, and a need to transmit (NTT) parameter being true.

The mechanism of internal control protocol collaboration in an interconnected system provided by the embodiment of the present document achieves a DRCP and LACP collaboration between multiple systems in one portal in a distributed the inner link aggregation group, aggregates multiple systems together into a logical system, and can effectively aggregate multiple systems together into an aggregation group, thus achieving a protection on the interconnected interface.

PREFERRED EMBODIMENTS OF THE INVENTION

Figure 1:
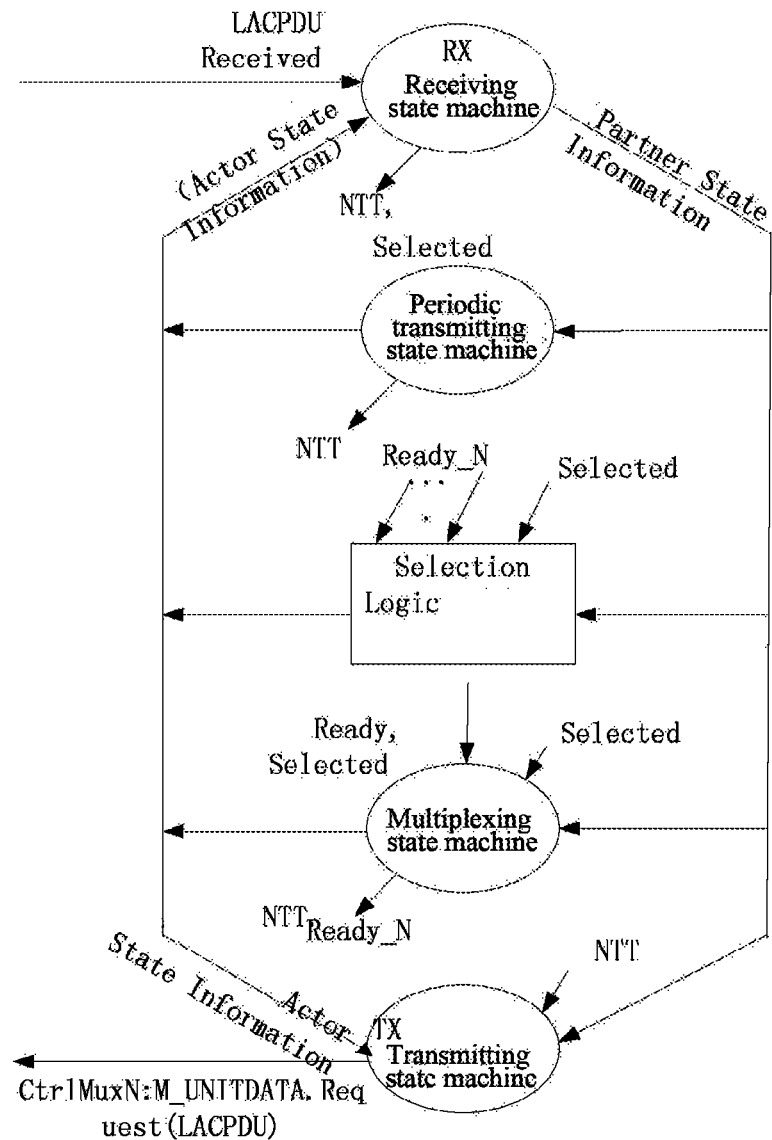
FIG. 1 is a diagram of internal relationship between state machines in accordance with an embodiment of the present document.

Hereinafter, in conjunction with the accompanying drawings, the embodiments of the present document will be described in detail. In the case of no conflict, embodiments and features in the embodiments of the present application may be combined arbitrarily with each other.

Furthermore, although a logical order is given in flow charts, in some cases, the steps shown or described herein may be executed in a different order.

The embodiment of the present document designs and implements LACP state machines based on system parameters notified by the DRCP, and controls operations of the respective state machines based on whether to support the DRNI as well as the system parameters notified by the DRCP, and notifies a port state change in the LACP state machines to the DRCP in real-time, in order to support the DRNI system, it needs to ensure that the DRCP exchanges packets with the partner system after notifying the system parameters, thereby avoiding the repeated oscillation of the partner system state machines, so as to achieve the collaboration of the DRCP state machines and the LACP state. The embodiment of the present document achieves the above-mentioned function by separately designing each state machine of the LACP.

The embodiment of the present document provides a collaboration method in a distributed resilient network interconnected system, comprising:

after receiving system parameters notified by a distributed relay control protocol (DRCP) system, a link aggregation control protocol (LACP) system taking the system parameters of the DRCP system as system negotiation parameters of the LACP system.

In an alternative of the present embodiment, it further comprises: the LACP system notifying a port state change in the LACP system to the DRCP system.

In an alternative of the present embodiment, it further comprises:

when a receiving state machine of the LACP system is in a port disabled state and meets a first preset condition, the receiving state machine jumping to a negotiation state after receiving the system parameters notified by the DRCP system, and jumping to an expired state after taking the system parameters of the DRCP system as the system negotiation parameters of the LACP system.

In an alternative of the present embodiment, it further comprises,

When the receiving state machine of the LACP system is in the port disabled state, when the LACP system supports the distributed resilient network interconnected (DRNI) system and has not received the system parameters notified by the DRCP system, the receiving state machine remaining in the port disabled state.

In an alternative of the present embodiment, it further comprises, when the LACP system meets the first preset condition and at least one of an actor port and a partner port is in an enabled state, a periodic transmitting link aggregation control protocol data unit function is enabled between the actor port and the partner port after receiving the system parameters notified by the DRCP system;

when the LACP system supports the DRNI and has not received the system parameters notified by the DRCP system, the periodic transmitting link aggregation control protocol data unit function is disabled between the actor port and the partner port.

In an alternative of the present embodiment, the first preset condition comprises: the LACP system supporting the distributed resilient network interconnected system (DRNI), the LACP being enabled, and the port being enabled.

In an alternative of the present embodiment, the LACP system notifying a port state change in the LACP system to the DRCP system comprises at least one of the following:

after a multiplexing state machine of the LACP system enters into a collecting state and a frame collection function of the actor port is enabled, notifying the DRCP system that the frame collection function of the actor port is enabled; or, triggering the DRCP system to query the state of the actor port;

after the multiplexing state machine of the LACP system enters into a distributing state and a frame distribution function of the actor port is enabled, notifying the DRCP system that the frame distribution function of the actor port is enabled; or, triggering the DRCP system to query the state of the actor port.

In an alternative of the present embodiment, it further comprises, when meeting a second preset condition, a transmitting state machine of the LACP system transmits LACP packets after receiving the system parameters notified by the DRCP system.

In an alternative of the present embodiment, it further comprises, when the LACP system supports the DRNI and has not received the system parameters notified by the DRCP system, the transmitting state machine of the LACP system does not transmit LACP packets.

In an alternative of the present embodiment, the second preset condition comprises: the LACP system supporting the DRNI, the LACP being enabled, and a need to transmit (NTT) parameter being true.

In the following, the LACP state machine, the receiving state machine, the periodic transmitting state machine, the multiplexing state machine and the transmitting state machine will be described respectively, and the relationship among the respective state machines is shown in FIG. 1.

1. the receiving module is configured to process the received LACP packets, parse the packets, record aggregation-related information of the partner, and call a selection logic module to set the selected state of the port, set the link aggregation related data according to the information of the partner, and make an appropriate treatment in accordance with whether the aggregation related data of the partner stored in the actor is aging, and motivate other state machines of the LACP protocol to operate.

Wherein, in the PORT_DISABLED state, it is to set the synchronization status of the partner port to FALSE and then determine to jump according to the system parameters notified by the DRCP, to achieve the purpose of collaborating with the DRCP, and the main collaboration content comprises:

a) when the system does not support the DRNI, then it is to jump to the Expired state when the variable values of the LACP_Enabled and the Port_enabled are TRUE simultaneously.

b) when the system supports the DRNI, then it is to wait for the system parameters notified by the DRCP, and jump to the NEGOTIATION state after receiving the system parameters notified by the DRCP and when the variable values of the LACP_Enabled and the Portal_enabled are TRUE simultaneously.

c) when the system supports the DRNI but has not received the system parameters notified by the DRCP, it is to remain in the PORT_DISABLED state, make the receiving state machine unable to receive the transmitting port state of the partner, and ensure that the multiplexing state machine cannot transfer from the ATTACHED state to the COLLECTING state.

d) In the NEGOTIATION state, it is to mainly record the related system parameters obtained from the DRCP, and then update the system parameters related to the local system, the system parameters comprise but are not limited to System ID, operating Key, etc., and afterwards, it jumps to the Expired state unconditionally.

2. the periodic transmitting state machine is configured to determine that the actor and the partner need to exchange LACPDU (Link Aggregation Control Protocol Data Unit) over the link if the periodic transmitting state machine wants to maintain the aggregation, and determine how long the periodic transmitting should occur. If either port needs, the periodic transmitting will occur. In the local state machine, it is configured to determine whether the periodic transmitting occurs in accordance with the related system parameters of the DRCP, thus achieving the purpose of collaborating with the DRCP, wherein the main collaboration content comprises:

a) when the system does not support the DRNI, then the periodic transmitting jumps to the FAST_PERIODIC state when the variable values of the LACP_Enabled and the Portal_enabled are TRUE simultaneously and one of the values of the Partner_Oper_Portal_State.LACP_Activity and the Actor_Oper_Portal_State.LACP_Activity is TRUE.

b) when the system supports the DRNI and obtains the related system parameters notified by the DRCP, then the periodic transmitting transfers to the FAST_PERIODIC state when the variable values of both the LACP_Enabled and the Portal_enabled are TRUE and one of the values of the Partner_Oper_Portal_State.LACP_Activity and the Actor_Oper_Portal_State.LACP_Activity is TRUE.

c) If the DRNI is supported and the state parameter information sent by the DRCP is not received, it is to enter into the NO_PERIODIC state, that is, the periodic transmitting state machine does not transmit before the DRCP notifies the system parameters, so as to prevent the partner from receiving wrong system parameters.

3. The multiplexing state machine: the complex state machine is configured to decide whether to block the port to control the enabling and disabling of the receiving and transmitting data functions of the port in accordance with the selected state of the actor and the partner selected state received by the receiving state machine. In this state, it needs to timely notify to the DRCP protocol based on the port state change of the Actor (actor) so that the DRCP state machine performs an appropriate operation according to the Actor port state, thus achieving the purpose of the LACP collaborating with the DRCP, and the main collaboration content comprises:

a) in the DETACHED state, the Actor port is in the initial state, which needs to be notified to the DRCP module. The selection logic performs an aggregation selection according to the system parameters of the state and selects to jump to the ATTACHED state.

b) in the ATTACHED state, the Actor. Sync state of the Actor port switches from FALSE to TRUE, which needs to be notified to the DRCP module. In this state, if receiving that the Partner port is synchronized and the port selection is in the SELECTED state, then the receiving state machine jumps to the COLLECTING state.

c) In the COLLECTING state, the Actor. Collecting state of the Actor port switches from FALSE to TRUE, which needs to be notified to the DRCP module. In this state, if receiving that the port state of the partner is already in the COLLECTING state, then it jumps to the DISTRIBUTING state.

d) In the DISTRIBUTING state, the Actor.Distributing state of the Actor port transfers from FALSE to TRUE, which needs to be notified to the DRCP module. If any one of the selected state, synchronized state or COLLECTING state of the port changes, then it jumps to the COLLECTING state.

4. the transmitting state machine is configured to be responsible for filling in content of the LACP protocol packets and transmitting the protocol packets, once receiving a notification, the transmitting state machine calls a packet transmitting module to transmit the packets as soon as possible; there are two default transmitting conditions for the transmitting state machine, one is that the periodic state machine transmits regularly, and transmits when the transmitting state machine meets the appropriate conditions. The other is transmitting based on the transmitting requirements of other state machines; the first case has been processed in the period transmitting state machine, while the second case needs to be judged according to the system parameters notified by the DRCP, thus realizing the purpose of collaborating with the DRCP, and the main collaboration content comprises:

a) when the system does not support the DRNI, the transmit state machine needs to transmit when LACP_Enabled=TRUE and NTT (Need to Transmit)=TRUE.

b) when the system supports the DRNI and obtains the relevant system parameters notified by the DRCP, the transmitting state machine needs to transmit when LACP_Enabled=TRUE and NTT=TRUE.

c) When the system supports the DRNI but has not received the system parameters notified by the DRCP, the transmitting state machine does not transmit to ensure that the partner port will not receive wrong system parameters which will result in a state repeated oscillation of the partner.

In the following, embodiments will be used to further illustrate the present document.

The First Embodiment

Figure 2:
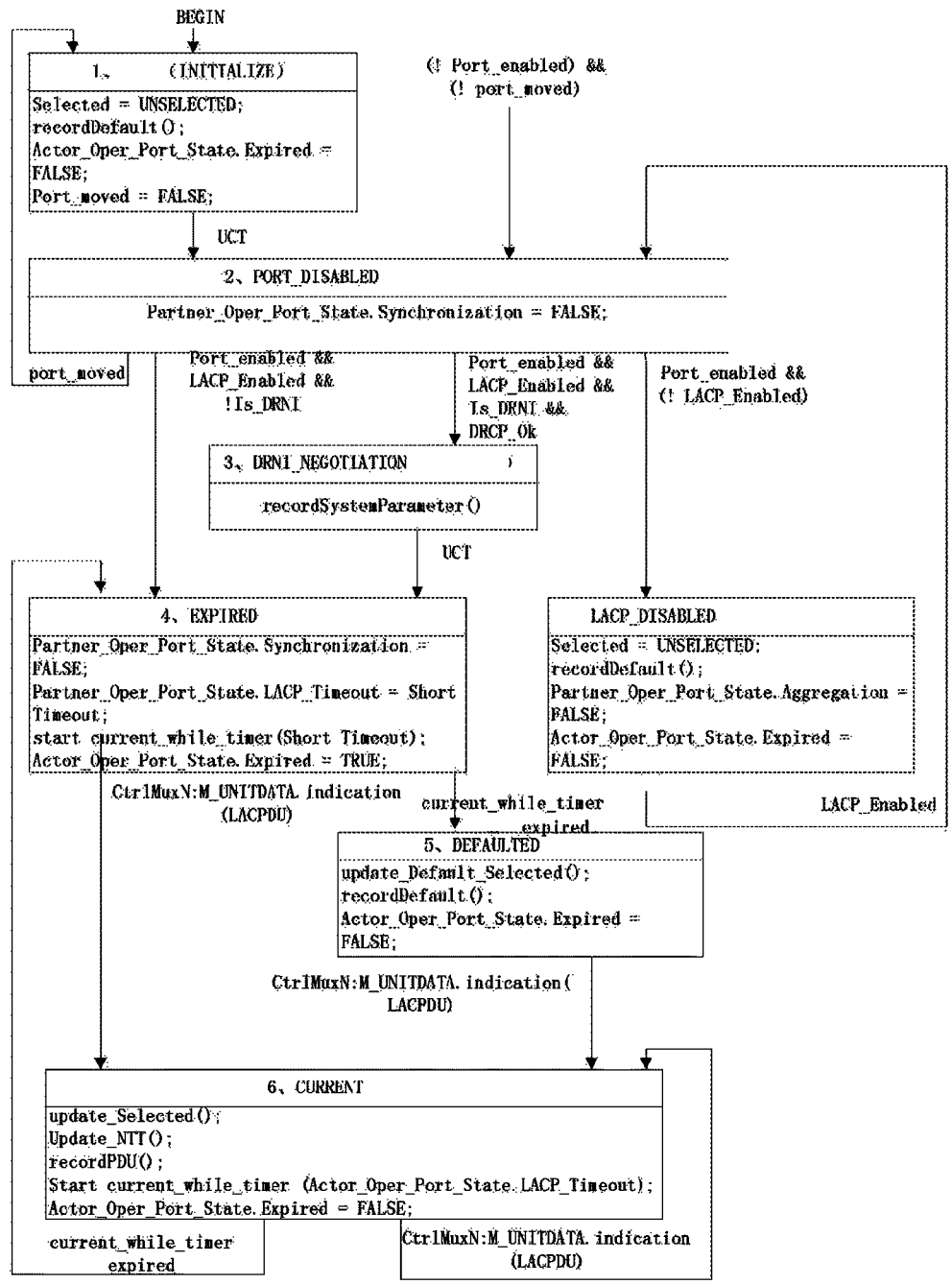
FIG. 2 is a schematic diagram of a receiving state machine in accordance with an embodiment of the present document.

FIG. 2 is a schematic diagram of a machine state transition of a receiving state machine. The functions of the receiving state machine comprise processing the received LACP packets, parsing the packets, recording aggregation-related information of the partner, and calling the selection logic module to set the selected state of the port, setting the link aggregation related data according to the information of the partner, and making an appropriate treatment by judging whether the aggregation related data of the partner stored in the actor is aging, and motivating other state machines of the LACP protocol to operate. It is the core of the group of state machines of the LACP protocol.

1. INITIALIZE State parameters under this state comprise: Selected parameter the INITIALIZE state initializes some parameter variables, it takes the partner parameter administrative value as the current operating value, and sets the Selected parameter to UNSELECTED. If entering into the INITIALIZE state because the Port_moved parameter is TRUE, the Port_moved is set to FALSE, and then the receiving state machine immediately enters into the PORT_DISABLED state.

2. PORT_DISABLED State

If the port becomes inoperable and the BEGIN event does not occur (BEGIN=FALSE), the receiving state machine enters into the PORT_DISABLED state. If the BEGIN event occurs, the receiving state machine also enters into this state.

In this state, the Partner_Oper_Portal_State.Synchronization parameter is set to FALSE. The current selected state of this state remains unchanged, so that when the port becomes operational again, the port remains connected with the same port in the same partner, so as not to disturb the top layer to be reconfigured.

When the port becomes operational and the LACP is enabled, it is to perform the state jumping judgment depending on whether the DRNI is supported (judge according to the Is_DRNI parameter) and whether the DRCP negotiation is completed (judge according to the DRCP_Ok parameter);

If Is_DRNI=FALSE (indicating that the DRNI is not supported), the state machine directly enters into the Expired state.

If Is_DRNI=TRUE (indicating that the DRNI is supported) and DRCP_Ok=TRUE (indicating that the DRCP negotiation is completed), the state machine enters into the NEGOTIATION state.

If Is_DRNI=TRUE and DRCP_Ok=FALSE (indicating that DRCP negotiation is not completed), the state machine remains in the PORT_DISABLED state unchanged, therefore the receiving state machine is in the non-receiving state before the DRCP protocol notification is completed, so as to ensure that the multiplexing state machine does not transit from the ATTACHED state to the COLLECTING state.

3. NEGOTIATION State

The state mainly receives the system parameters, including the system ID and the operational Key, notified by the DRCP protocol, records these two parameters, and takes these two parameters as the LACP system negotiation parameters of the system to be used in the LACP negotiation with the partner device, thereafter unconditionally transits to the Expired state.

4. Expired State

If the LACPDU is not received before the current_while_timer (the receiving protocol information expired detecting timer) timer expires, the state machine enters into the Expired state. The Partner_Oper_Portal_State.Synchronization is set to FALSE, the current operation value of the LACP_Timeout (LACP timeout selection) variable of the Partner is set to Short Timeout, and values of the current_while_timer and the Short_Timeout_Time are enabled. This is a temporary state; the setting of the LACP_Timeout makes the Actor to quickly transmit the LACPDUs to re-establish a communication with the Partner.

5. DEFAULTED State

If the LACPDU is not received before the current_while_timer timer expires again, the state machine enters into the DEFAULTED state. The recordDefault function uses the administrative configuration value to rewrite the current operating parameter for the Partner. This can configure the aggregation and the single link when there is no protocol Partner exists, and the default configuration is overwritten until one Partner is activated. If the link aggregation group changes, then the update_Default_Selected function (updating the value of the Selected variable with the administrative parameter value of the Partner) sets the Selected variable to UNSELECTED. Because all the operating parameters are now set to the local administrative values, they are not synchronized for the link aggregation group, thus the Partner_Oper_Portal_State.Synchronization is TRUE.

6. CURRENT State

Upon receiving the LACPDU, the receiving state machine enters into the CURRENT state. If the link aggregation group jointly represented by the information of the protocol partner and the actor is changed, the update_Selected (using the latest received LACPDU parameter value to update the value of the Selected variable) function sets the Selected variable to the UNSELECTED.Selected variable for the multiplexing state machine to use.

The update_NTT (using the latest received LACPDU parameter value to update the NTT variable) function is used to determine whether it needs to initialize the protocol to transmit; if the partner considers that the operating parameters of the actor are not the latest, the NTT is set to TRUE. The recordPDU (recording parameters carried in the received LACPDU) function records information of the partner operating variables in the LACPDU and enables the current_while_timer timer. The timer uses the Short_Timeout_Time or the Long_Timeout_Time, depending on the value of the actor operating LACP_Timeout.

The Second Embodiment

Figure 3:
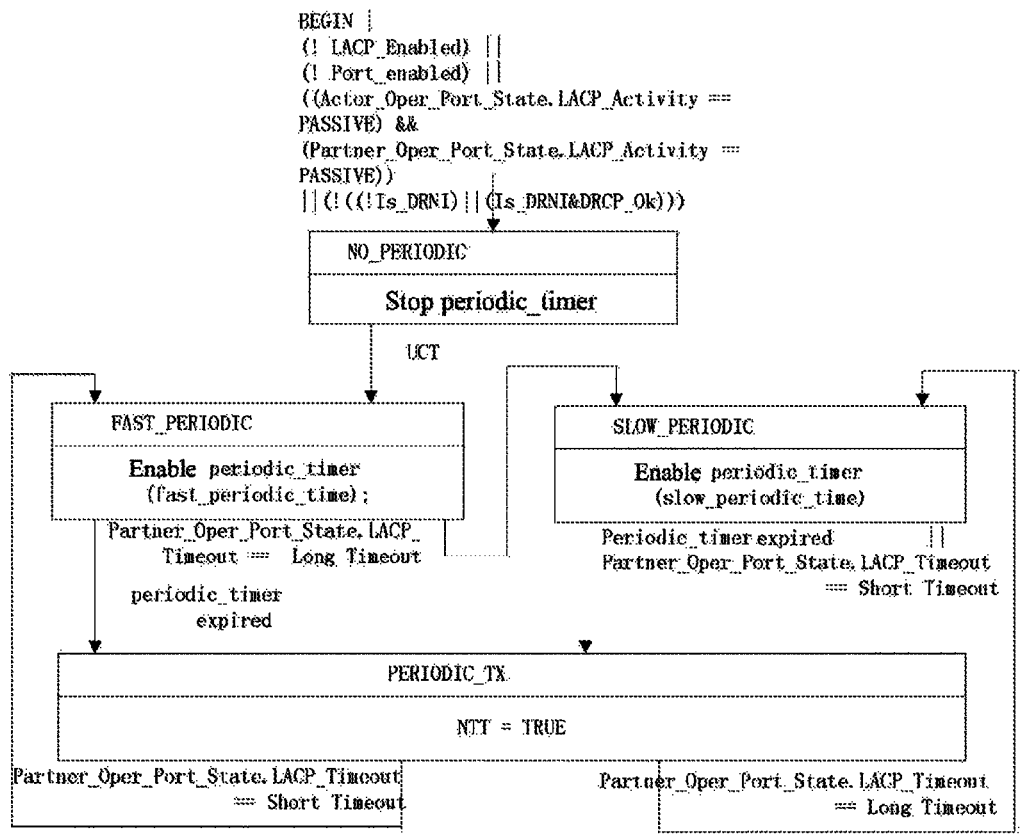
FIG. 3 is a schematic diagram of a periodic transmitting state machine in accordance with an embodiment of the present document.

FIG. 3 is a schematic diagram of state transition of a periodic transmitting state machine.

The periodic transmitting state machine is configured to determine that the actor and the partner need to exchange the LACPDUs on the link in order to maintain the aggregation, and determine how long the periodic transmitting should occur. If either port needs, the periodic transmitting will occur. The transmission period is determined by the partner; this period is related to the rate of the receiving information timeout of the partner.

The periodic transmitting state machine is further configured to decide whether the periodic transmitting occurs in accordance with the DRCP relevant system parameters.

If the DRNI is not supported (Is_DRNI=FALSE), the periodic transmitting occurs when the values of both the LACP_Enabled and the portal_enabled are TRUE, and one of the Partner_Oper_Portal_State.LACP_Activity and the Actor_Oper_Portal_State.LACP_Activity is TRUE.

If the DRNI is supported (Is_DRNI=TRUE) and the system parameters notified by the DRCP are received (DRCP_Ok=TRUE), the periodic transmitting will occur when the LACP_Enabled and the portal_enabled variables are TRUE and one of the Partner_Oper_Portal_State.LACP_Activity and the Actor_Oper_Portal_State.LACP_Activity is TRUE.

Otherwise, the periodic transmitting is not performed. When the DRNI is supported (Is_DRNI=TRUE) but system parameters notified by the DRCP are not received (DRCP_Ok=FASLE), the periodic transmitting state machine will not transmit, and will not use the local default system parameters to transmit, thus ensuring that the partner will not receive temporary wrong system parameters and avoiding the repeated oscillation of the partner system state.

each state of the periodic transmitting state machine will be described as follows:

NO_PERIODIC: in this state, the periodic transmitting is disabled.

FAST_PERIODIC: in this state, the periodic transmitting is enabled, and the fast periodic is used to transmit. The value of the fast period can be set as desired.

SLOW_PERIODIC: when in this state, the periodic transmitting is enabled, and the slow period is used to transmit. The value of the slow period can be set as desired. In general, the fast period is shorter than the slow period.

PERIODIC_TX: this is a temporary state to be entered after the periodic_timer timer expires, it sets the NTT and enters into the FAST_PERIODIC state or the SLOW_PERIODIC state according to the LACP_Timeout setting of the partner.

The Third Embodiment

Figure 4:
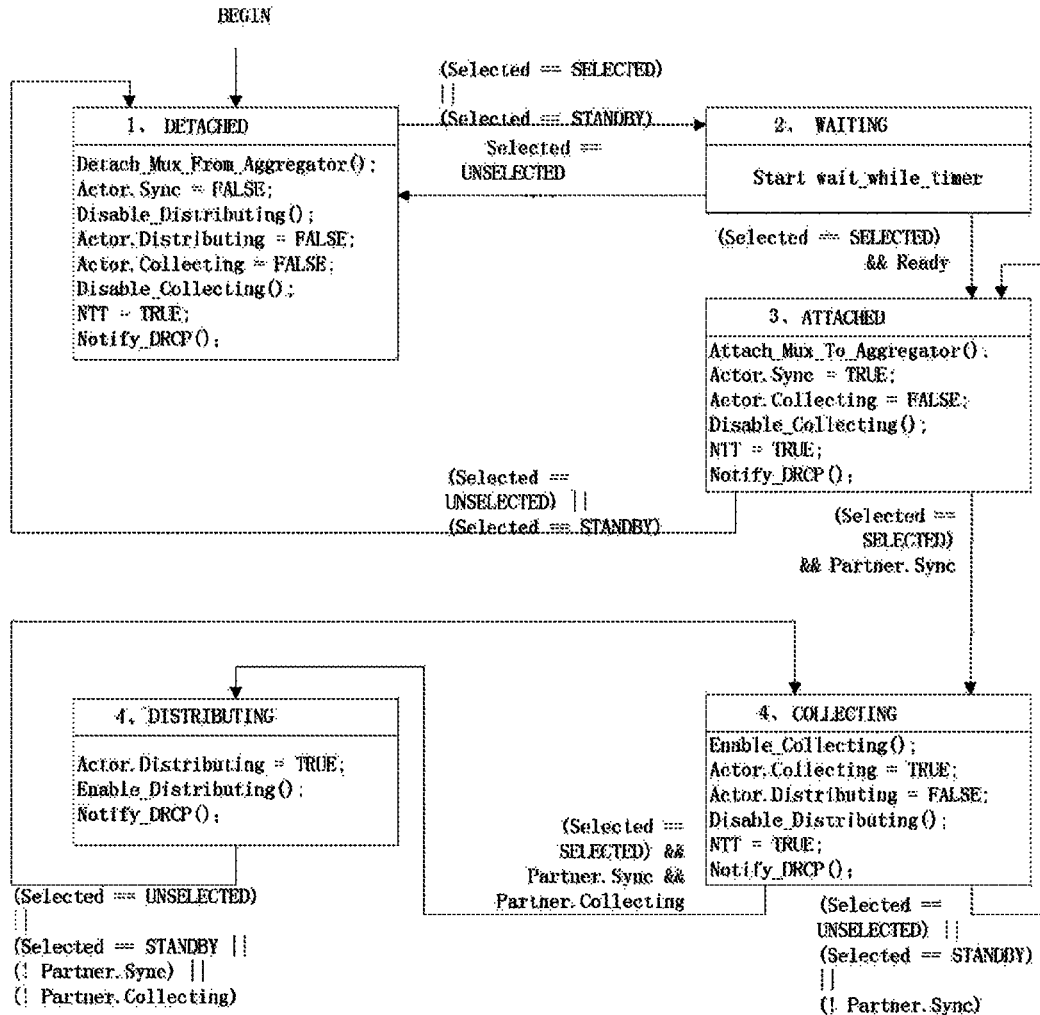
FIG. 4 is a schematic diagram of a multiplexing state machine in accordance with an embodiment of the present document.

FIG. 4 is a schematic diagram of a state transition of a multiplexing state machine. The multiplexing state machine is set to decide whether to block the port to control the enabling and disabling of the functions of receiving and transmitting data of the port based on the selected states of the actor and the partner. In this state, the port state change is notified to the DRCP module in real-time.

1. DETACHED State

The Selected variable changes to the UNSELECTED or STANDBY state, which causes the state machine to enter into the DETACHED state. The process of detaching the port from the aggregator begins. Once the detaching process is completed, the value of the Actor_Oper_Portal_State.Synchronization is set to FALSE, indicating that the actor considers that the port is OUT_OF_SYNC, and the frame distribution function of the port is disabled, values of the Actor_Oper_Portal_State.Distributing and the Actor_Oper_Portal_State.Collecting are set to FALSE, and the frame collection function of the port is disabled. The multiplexing state machine remains in the DETACHED state until the selection logic can select a suitable aggregator.

The function Notify_DRCP is used to judge whether to support the DRNI, and decide to notify the port real-time state to the DRCP module in accordance with the judgment result, and it does not notify if the LACP system does not support the DRNI, otherwise, then it needs to notify the state of Actor. Sync=FALSE, Actor. Collecting (the same as Actor_Oper_Portal_State.Distributing)=FALSE and Actor.Distributing (the same as Actor_Oper_Portal_State.Collecting)=FALSE. Herein the notification form can be directly notifying the state to the DRCP module, or may be triggering the DRCP module to directly query the port state of the local system.

It is to enter into the WAITING state when the selection is completed.

2. WAITTING State

The WAITTING state: it needs to wait for a period of time before attached, which is decided by the wait_while_timer. After waiting, the Ready is TRUE, and it is to enter into the ATTACHED state.

3. ATTACHED State

When entering into the ATTACHED state, the multiplexing state machine starts the process of attaching the port to the selected aggregator. Once the attaching process is completed, the value of the Actor_Oper_Portal_State.Synchronization is set to TRUE, indicating that the actor considers that the port is IN_SYNC, and the value of the Actor_Oper_Portal_State.Collecting is set to FALSE. The frame collection function of the port is disabled. In the combined control state diagram, the frame distribution function of the port is disabled similarly, and the value of the Actor_Oper_Portal_State.Distributing is set to FALSE.

The function Notify_DRCP notifies the port real-time state to the DRCP as desired, herein it comprises notifying the state of Actor.Sync=TRUE, Actor.Collecting=FALSE and Actor. Distributing=FALSE.

When receiving that the synchronized state of the partner port is TRUE (Partner.Sync=TRUE), it is to enter into the COLLECTING state.

4. COLLECTING and DISTRIBUTING States

In the COLLECTING state, the frame collection feature of the port is enabled, then the Actor_Oper_Portal_State.Collecting is set to TRUE, the frame distribution function of the port is disabled and the Actor_Portal_Oper_State.Distributing is set to FALSE.

The function Notify_DRCP notifies the port real-time state to the DRCP as desired, herein it comprises notifying the state of Actor.Sync=TRUE, Actor.Collecting=TRUE and Actor.Distributing=FALSE.

If the Selected parameter changes to UNSELECTED or STANDBY, or the synchronized state of the partner changes to FALSE, the multiplexing state machine transits to the ATTACHED state.

When the partner indicates that its frame collection function is enabled (Partner_Oper_Portal_State.Collecting is TRUE), the multiplexing state machine transits to the DISTRIBUTING state. The Actor_Oper_Portal_State.Distributing is set to TRUE, then the frame distribution function of the port is enabled.

The function Notify_DRCP notifies the port real-time state to the DRCP as desired, herein it comprises notifying the state of Actor.Sync=TRUE, Actor. Collecting=TRUE and Actor.Distributing=TRUE.

If the value of the Selected variable changes to UNSELECTED or STANDBY, or the synchronized state of the partner changes to FALSE, or the partner indicates that the frame collection function of the partner is disabled (Partner_Oper_Portal_State.Collecting is FALSE), it transits from the DISTRIBUTING state to the COLLECTING state.

The Fourth Embodiment

The transmitting state machine is configured to fill in the content of the LACP packets and process the protocol packet transmission, when receiving a notification, the transmitting state machine immediately calls the packet transmitting module to transmit packets. The transmitting state machine needs to judge whether to transmit based on the system parameters notified by the DRCP.

When the system does not support the DRNI, the transmitting state machine ensures that one LACPDU with the correct format is sent when LACP_Enabled=TRUE and NTT=TRUE.

When the system supports the DRNI and obtains the relevant system parameters notified by the DRCP, the transmitting state machine ensures that one LACPDU with the correct format is sent when LACP_Enabled=TRUE and NTT=TRUE.

When the system supports the DRNI while has not received the system parameters notified by the DRCP, the transmitting state machine does not transmit, thus ensuring that the partner port will not receive wrong system parameters which will result in a state repeated oscillation of the partner.

The transmitting state machine limits that there are no more than three LACPDUs to be transmitted in one Fast_Periodic_Time interval. When this limit exists and the NTT is TRUE, the transmission will be delayed until this limit is no longer valid. When the transmitting state machine transmits one LACPDU completely, the NTT is set to FALSE. The LACPDU transmission mode is based on the transmission state information when the current transmission opportunity occurs.

Figure 5:
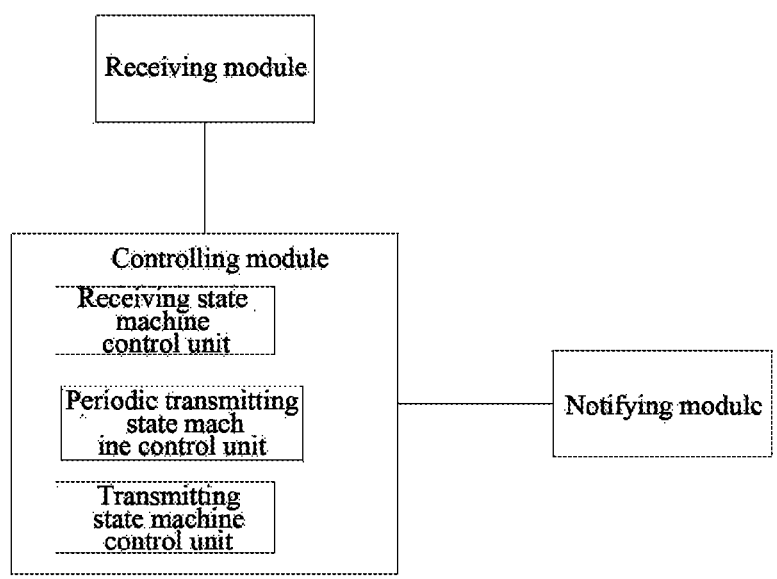
FIG. 5 is a block diagram of a link aggregation control protocol system in accordance with an embodiment of the present document.

The embodiment of the present document further provides a link aggregation control protocol system, as shown in FIG. 5, the Link Aggregation Control Protocol (LACP) system comprises a receiving module and a controlling module, wherein:

the receiving module is configured to: receive system parameters notified by a distributed relay control protocol (DRCP) system;

the controlling module is configured to: take the system parameters of the DRCP system as system negotiation parameters of the LACP system.

In an alternative of the present embodiment, the LACP system further comprises: a notifying module, configured to notify the port state change in the LACP system to the DRCP system.

In an alternative of the present embodiment, the controlling module further comprises a receiving state machine control unit, configured to, when a receiving state machine is in the port disabled state and meets the first preset condition, control the receiving state machine to jump to a negotiation state after receiving the system parameters notified by the DRCP system, and control the receiving state machine to jump to an expired state after taking the system parameters of the DRCP system as the system negotiation parameters of the LACP system.

In an alternative of the present embodiment, the receiving state machine control unit is further configured to: when the receiving state machine is in a port disabled state, and the LACP system supports the distributed resilient network interconnected system (DRNI) and has not received the system parameters notified by the DRCP system, control the receiving state machine to remain in the port disabled state.

In an alternative of the present embodiment, the controlling module is further configured to:

when the LACP system meets a first preset condition and at least one of an actor port and a partner port is enabled, enable a periodic transmitting link aggregation control protocol data unit function between the actor port and the partner port after receiving the system parameters notified by the DRCP system; and when the LACP system supports the DRNI and has not received the system parameters notified by the DRCP system, disable the periodic transmitting link aggregation control protocol data unit function between the actor port and the partner port.

In an alternative of the present embodiment, the first preset condition comprises: the LACP system supporting the distributed resilient network interconnected system (DRNI), the LACP being enabled, and the port being enabled.

In an alternative of the present embodiment, the notifying module notifying a port state change in the LACP system to the DRCP system comprises at least one of the following:

after a multiplexing state machine of the LACP system enters into a collecting state and a frame collection function of the actor port is enabled, notifying the DRCP system that the frame collection function of the actor port is enabled; or, triggering the DRCP system to query the state of the actor port;

after the multiplexing state machine of the LACP system enters into a distributing state and the frame distribution function of the actor port is enabled, notifying the DRCP system that the frame distribution function of the actor port is enabled; or, triggering the DRCP system to query the state of the actor port.

In an alternative of the present embodiment, the controlling module further comprises a transmitting state machine control unit, which is configured to: when a second preset condition is met, control the transmitting state machine of the LACP system to transmit LACP packets after receiving the system parameters notified by the DRCP system.

In an alternative of the present embodiment, the transmitting state machine control unit is further configured to: when the LACP system supports the DRNI and has not received the system parameters notified by the DRCP system, control the transmitting state machine of the LACP system to not transmit LACP packets.

In an alternative of the present embodiment, the second preset condition comprises: the LACP system supporting the DRNI, the LACP being enabled, and a need to transmit (NTT) parameter being true.

Those ordinarily skilled in the art can understand that all or some of steps of the abovementioned method may be completed by the programs instructing the relevant hardware, and the programs may be stored in a computer-readable storage medium, such as the read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The mechanism of internal control protocol collaboration in an interconnected system provided by the embodiment of the present document achieves a DRCP and LACP collaboration between multiple systems in one portal in a distributed the inner link aggregation group, aggregates multiple systems together into a logical system, and can effectively aggregate multiple systems together into an aggregation group, thus achieving a protection on the interconnected interface.

What is claimed is:

1. A collaboration method in a distributed resilient network interconnected (DRNI) system, comprising:
   after receiving system parameters notified by a distributed relay control protocol (DRCP) system, a link aggregation control protocol (LACP) system taking the system parameters of the DRCP system as system negotiation parameters of the LACP system;
   wherein, the method further comprises:
   when a receiving state machine of the LACP system is in a port disabled state and meets a first preset condition, the receiving state machine jumping to a negotiation state after receiving the system parameters notified by the DRCP system, and jumping to an expired state after taking the system parameters of the DRCP system as the system negotiation parameters of the LACP system.

2. The method of claim 1, wherein, the method further comprises: the LACP system notifying a port state change in the LACP system to the DRCP system.

3. The method of claim 1, wherein, the method further comprises:
   when the receiving state machine of the LACP system is in the port disabled state, when the LACP system supports the distributed resilient network interconnected (DRNI) system and has not received the system parameters notified by the DRCP system, the receiving state machine remaining in the port disabled state.

4. The method of claim 1, wherein, the method further comprises:
   when the LACP system meets the first preset condition and at least one of an actor port and a partner port is in an enabled state, enabling a periodic transmitting link aggregation control protocol data unit function between the actor port and the partner port after receiving the system parameters notified by the DRCP system;
   when the LACP system supports the DRNI and has not received the system parameters notified by the DRCP system, disabling the periodic transmitting link aggregation control protocol data unit function between the actor port and the partner port,
   preferably,
   wherein, the first preset condition comprises: the LACP system supporting the distributed resilient network interconnected system (DRNI), the LACP being enabled, and the port being enabled.

5. The method of claim 1, wherein, the first preset condition comprises: the LACP system supporting the distributed resilient network interconnected system (DRNI), the LACP being enabled, and the port being enabled.

6. The method of claim 2, wherein, the LACP system notifying a port state change in the LACP system to the DRCP system comprises at least one of the following:

after a multiplexing state machine of the LACP system enters into a collecting state and a frame collection function of the actor port is enabled, notifying the DRCP system that the frame collection function of the actor port is enabled; or, triggering the DRCP system to query the state of the actor port;

after the multiplexing state machine of the LACP system enters into a distributing state and a frame distribution function of the actor port is enabled, notifying the DRCP system that the frame distribution function of the actor port is enabled; or, triggering the DRCP system to query the state of the actor port.

7. The method of claim 1, wherein, the method further comprises: when a second preset condition is met, a transmitting state machine of the LACP system transmitting LACP packets after receiving the system parameters notified by the DRCP system.

8. The method of claim 7, wherein, the method further comprises: when the LACP system supports the DRNI and has not received the system parameters notified by the DRCP system, the transmitting state machine of the LACP system not transmitting LACP packets.

9. The method of claim 7, wherein, the second preset condition comprises: the LACP system supporting the DRNI, the LACP being enabled, and a need to transmit (NTT) parameter being true.

10. A link aggregation control protocol system, wherein the Link Aggregation Control Protocol (LACP) system comprises a hardware and a memory storing programs, wherein the hardware is configured to execute the programs in the memory to
receive system parameters notified by a distributed relay control protocol (DRCP) system;
take the system parameters of the DRCP system as system negotiation parameters of the LACP system;
wherein, the hardware is configured to
when a receiving state machine is in a port disabled state and meets a first preset condition, control the receiving state machine to jump to a negotiation state after receiving the system parameters notified by the DRCP system, and control the receiving state machine to jump to an expired state after taking the system parameters of the DRCP system as the system negotiation parameters of the LACP system.

11. The system of claim 10, wherein, the hardware is configured to notify a port state change in the LACP system to the DRCP system.

12. The system of claim 10, wherein, the hardware is configured to: when the receiving state machine is in a port disabled state and the LACP system supports a distributed resilient network interconnected system (DRNI) and has not received the system parameters notified by the DRCP system, control the receiving state machine to remain in the port disabled state.

13. The system of claim 10, wherein, the hardware is configured to:
when the LACP system meets the first preset condition and at least one of an actor port and a partner port is enabled, after receiving the system parameters notified by the DRCP system, enable a periodic transmitting link aggregation control protocol data unit function between the actor port and the partner port; and,
when the LACP system supports a distributed resilient network interconnected system DRNI and has not received the system parameters notified by the DRCP system, disable the periodic transmitting link aggregation control protocol data unit function between the actor port and the partner port,
preferably,
wherein, the first preset condition comprises: the LACP system supporting the distributed resilient network interconnected (DRNI) system, the LACP being enabled, and the port being enabled.

14. The system of claim 10, wherein, the first preset condition comprises: the LACP system supporting a distributed resilient network interconnected (DRNI) system, the LACP being enabled, and the port being enabled.

15. The system of claim 11, wherein, the hardware notifying a port state change in the LACP system to the DRCP system comprises at least one of the following:
after a multiplexing state machine of the LACP system enters into a collecting state and a frame collection function of the actor port is enabled, notifying the DRCP system that the frame collection function of the actor port is enabled; or, triggering the DRCP system to query the state of the actor port;
after the multiplexing state machine of the LACP system enters into a distributing state and the frame distribution function of the actor port is enabled, notifying the DRCP system that the frame distribution function of the actor port is enabled; or, triggering the DRCP system to query the state of the actor port.

16. The system of claim 10, wherein, the hardware is configured to: when a second preset condition is met, after receiving the system parameters notified by the DRCP system, control a transmitting state machine of the LACP system to transmit LACP packets.

17. The system of claim 16, wherein, the hardware is further configured to: when the LACP system supports a distributed resilient network interconnected system DRNI and has not received the system parameters notified by the DRCP system, control the transmitting state machine of the LACP system to not transmit LACP packets.

18. The system of claim 16, wherein,
the second preset condition comprises: the LACP system supporting the DRNI, the LACP being enabled, and a need to transmit (NTT) parameter being true.

* * * * *